United States Patent
Most et al.

(10) Patent No.: US 8,083,249 B2
(45) Date of Patent: Dec. 27, 2011

(54) TRAILER COUPLER HAVING AN INTEGRATED LOCK

(75) Inventors: Toby Most, Twinsburg, OH (US); Francis Bernart, North Canton, OH (US)

(73) Assignee: Cequent Consumer Products, Solon, OH (US)

( * ) Notice: Subject to any disclaimer, the term of this patent is extended or adjusted under 35 U.S.C. 154(b) by 286 days.

(21) Appl. No.: 12/150,391

(22) Filed: Apr. 28, 2008

(65) Prior Publication Data

US 2009/0066059 A1    Mar. 12, 2009

Related U.S. Application Data

(60) Provisional application No. 60/926,318, filed on Apr. 26, 2007.

(51) Int. Cl.
*B60D 1/60* (2006.01)

(52) U.S. Cl. ........ 280/507; 280/511; 280/512; 280/513; 70/34; 70/258; 70/237

(58) Field of Classification Search .................. 280/507, 280/511–513; 70/34, 237, 258
See application file for complete search history.

(56) References Cited

U.S. PATENT DOCUMENTS

| | | | | |
|---|---|---|---|---|
| 2,180,272 | A | 11/1939 | Bastuscheck | |
| 3,139,291 | A | 6/1964 | Geresy | |
| 3,514,980 | A * | 6/1970 | Doyle | 70/258 |
| 3,770,299 | A | 11/1973 | Murphy | |
| 3,796,074 | A * | 3/1974 | Vik | 70/231 |
| 3,924,878 | A * | 12/1975 | Utman et al. | 280/507 |
| 4,209,184 | A * | 6/1980 | Byers | 280/511 |
| 4,704,883 | A | 11/1987 | Dykes | |
| 4,925,205 | A | 5/1990 | Villalon et al. | |
| 5,018,759 | A | 5/1991 | Villalon et al. | |
| 6,644,071 | B2 * | 11/2003 | Gilbertson et al. | 70/14 |
| 7,300,068 | B1 * | 11/2007 | Johnsen | 280/507 |
| 7,353,671 | B2 * | 4/2008 | Recknagel et al. | 70/34 |
| 7,413,212 | B2 * | 8/2008 | Hsai | 280/507 |
| 7,448,236 | B2 * | 11/2008 | Recknagel et al. | 70/34 |
| 2001/0023601 | A1 * | 9/2001 | Gilbertson et al. | 70/258 |
| 2005/0252256 | A1 | 11/2005 | Escalante, III | |
| 2006/0075792 | A1 | 4/2006 | Escalante, III | |
| 2007/0175246 | A1 * | 8/2007 | Hsai | 70/57 |

* cited by examiner

*Primary Examiner* — Joanne Silbermann
*Assistant Examiner* — Michael Stabley
(74) *Attorney, Agent, or Firm* — McDonald Hopkins LLC

(57) ABSTRACT

The present invention provides a trailer coupler having an integrated locking device attached to the handle or the coupler body. The handle of the trailer coupler moves from a first position where the hitch ball is insertable to a second position where the hitch ball is prevented from insertion. The locking device having a locking pin that is insertable into the aperture of the handle to prevent movement of the handle from the second position to the first position.

20 Claims, 3 Drawing Sheets

TRAILER COUPLER HAVING AN INTEGRATED LOCK

CROSS-REFERENCE TO RELATED APPLICATIONS

This application claims priority from U.S. Provisional Patent Application No. 60/926,318 entitled "Trailer Coupler Having an Integrated Lock," filed on Apr. 26, 2007, which is hereby incorporated by reference in its entirety.

FIELD OF THE INVENTION

The present invention relates generally to locking devices for trailer coupler, and particularly, to a trailer coupler having an integrated lock.

BACKGROUND OF THE INVENTION

Standard trailer couplers, such as those connected to trailers that pull boats, trailers, campers, and the like, utilize a coupler socket for engaging a standardized hitch ball mounted on a towing vehicle. A handle is connected to the coupler socket to lock and unlock the coupler socket from the hitch ball. Such standard trailer coupler sockets are manufactured to receive most standard ball sizes to permit interchangeability between various hitch balls. Even if the coupler socket is sized for a slightly larger or slightly smaller hitch ball, the coupler socket frequently engages the hitch ball sufficient to be pulled by the towing vehicle. However, due to this interchangeability and the allowances provided by the coupler socket, it is possible for an unauthorized person having a standard hitch ball to connect an unattended and unattached trailer and tow the trailer away with any associated cargo.

While locking devices have long been employed to prevent or deter the theft of unattended and unattached trailers, the locking devices of the prior art are particularly unsuited for many reasons. Prior art locking devices are particularly unsuited, because the lock is a separate component that can be lost or misplaced. Many locking devices are shaped to cover at least a portion of the coupler socket. As a result, these locking devices are bulky and complicated to use. In addition, these devices require a significant amount of time to properly secure to the trailer coupler.

Another detriment to the locking devices is that these locking devices are susceptible to unauthorized detachment from the coupler. The susceptibility to unauthorized detachment of the locking device is because the locking device is separate from the coupler. In addition, prior art locking devices may be removed from the coupler without hindering the operation of the coupler socket. As a result, locking devices fail to adequately protect the trailer from theft. The coupler of the present invention overcomes the disadvantages of the prior art by providing a coupler having an integrated lock.

DETAILED DESCRIPTION OF THE INVENTION

Figure 1:
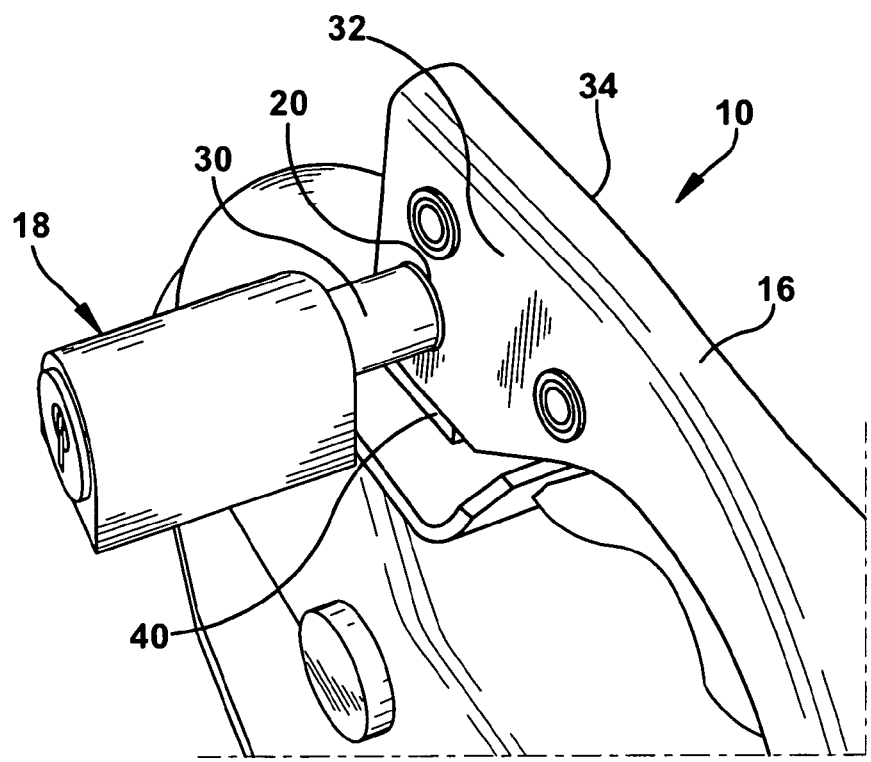
FIG. 1 illustrates a locking device detached from a handle of a coupler in an embodiment of the present invention.
Figure 2:
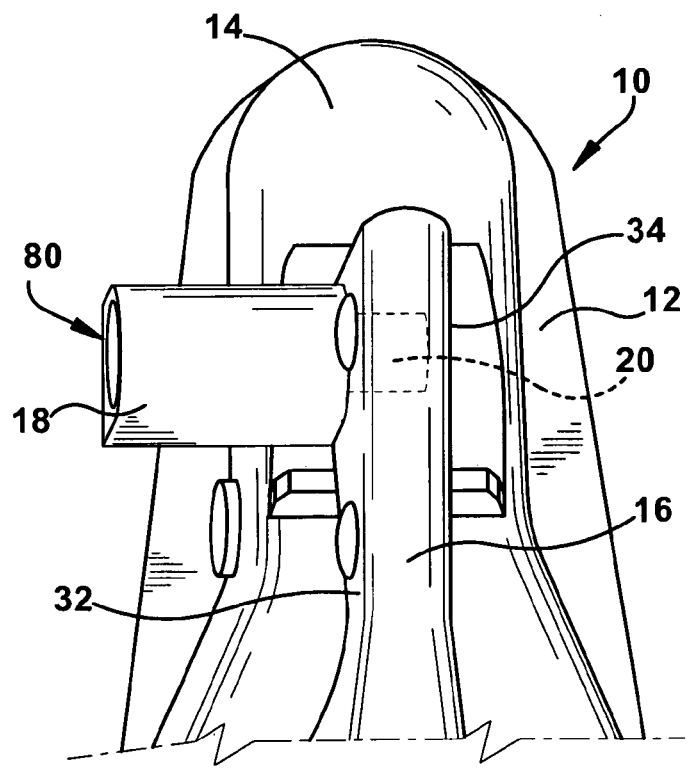
FIG. 2 illustrates a locking device attached to a handle of a coupler in an embodiment of the present invention.

Referring now to the drawings, and in particular to FIGS. 1 and 2, a coupler 10 comprises a coupler body 12 and a ball socket 14. The coupler 10 is attached to or integrally formed with a trailer (not shown). The ball socket 14 is sized and shaped to secure to a hitch ball (not shown) of a towing vehicle, such as an automobile. The ball socket 14 has a ball clamp (not shown) within the interior of the ball socket 14. The ball clamp is movable from a locked position and an unlocked position. The hitch ball may be removed or inserted into the ball socket 14 when the ball clamp is at the unlocked position. At the locked position, the ball clamp prevents entry or removal of the hitch ball from the ball socket 14. The ball socket 14 is securable to the hitch ball to operably connect the trailer to the towing vehicle.

A handle 16 is connected to the ball socket 14 to move the ball clamp from the locked position to the unlocked position. For example, the handle 16 moves from a first position to a second position to move the ball clamp from the locked position to the unlocked position. In a preferred embodiment, the handle 16 moves upward away from the coupler body 12 to the first position to move the ball clamp to the unlocked position. In such an embodiment, the handle 16 moves downward toward the coupler body 12 to the second position to move the ball clamp to the locked position. At the upward (first) position, the handle 16 causes the ball clamp to retract to permit entry and removal of the hitch ball from the ball socket 14. At the downward (second) position, the handle 16 moves the ball clamp to engage the hitch ball and to prevent removal of the hitch ball. If the ball socket 14 is not engaging a hitch ball, the handle at the downward (second) position prevents entry of a hitch ball into the ball socket 14.

Figure 3:
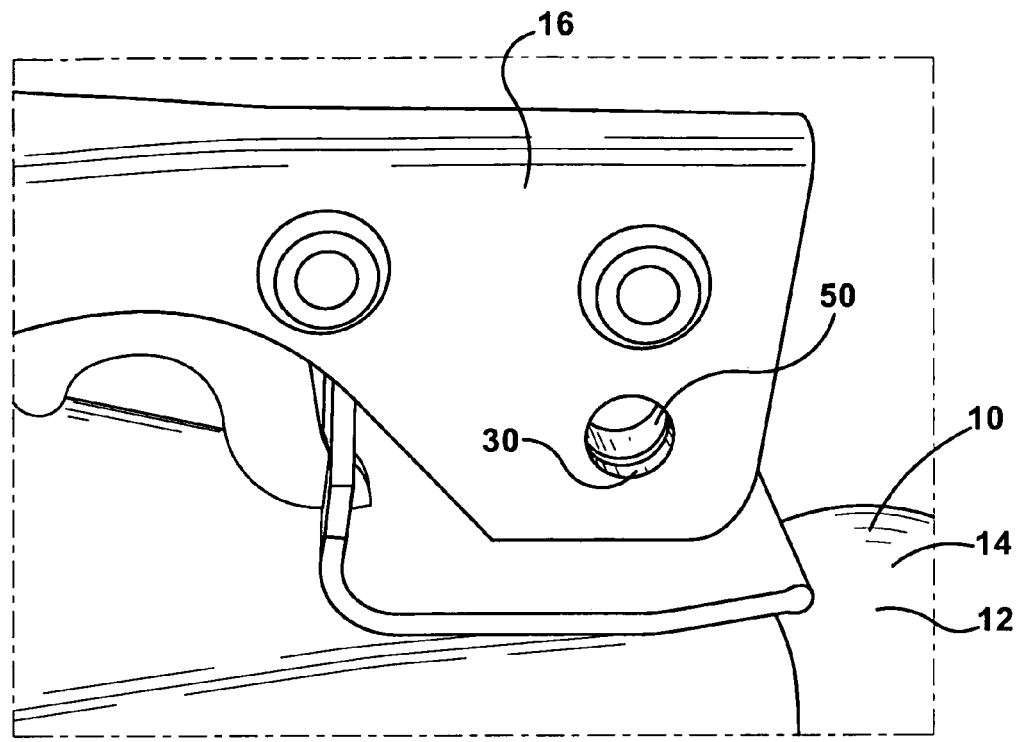
FIG. 3 illustrates a handle of a coupler with a locking device at the locked position in an embodiment of the present invention.
Figure 4:
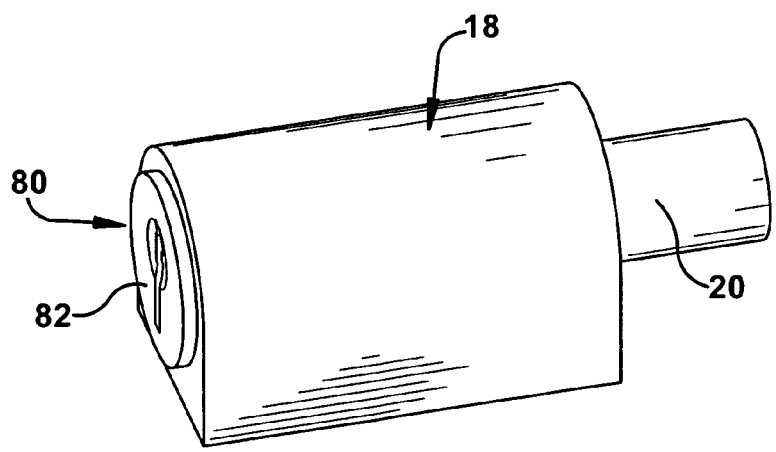
FIG. 4 illustrates a locking device at a locked position in an embodiment of the present invention.

The handle 16 may have an aperture 30 extending through a proximate side 32 and a distal side 34 of the handle 16. A support 40 may be attached to the coupler body 12, such as by welding the support 40 to the coupler body 12. In an embodiment, the support 40 is integrally formed, such as by casting the support 40 with the coupler body 12. The support 40 may have an aperture 50 aligned with the aperture 30 of the handle 16 when the handle 16 is at the downward (second) position. As shown in FIGS. 1-3, the support 40 may be positioned between the proximate side 32 and the distal side 34 of the handle 16 when the handle 16 is at the downward (second) position. In one embodiment, shown in FIG. 5, the handle 16 may be positioned between the support 40. In such an embodiment the support may have the aperture 50 aligned with the aperture 30 on one of or both of the sides 32, 34 of the handle 16. For example, the handle 16 may have the aperture 30 extending through the proximate side 32 and the distal side 34, and the support 40 may have two sections each having the aperture 50 aligned with the aperture 30 of the handle 16 when the handle 16 is at the downward (second) position.

Figure 5:
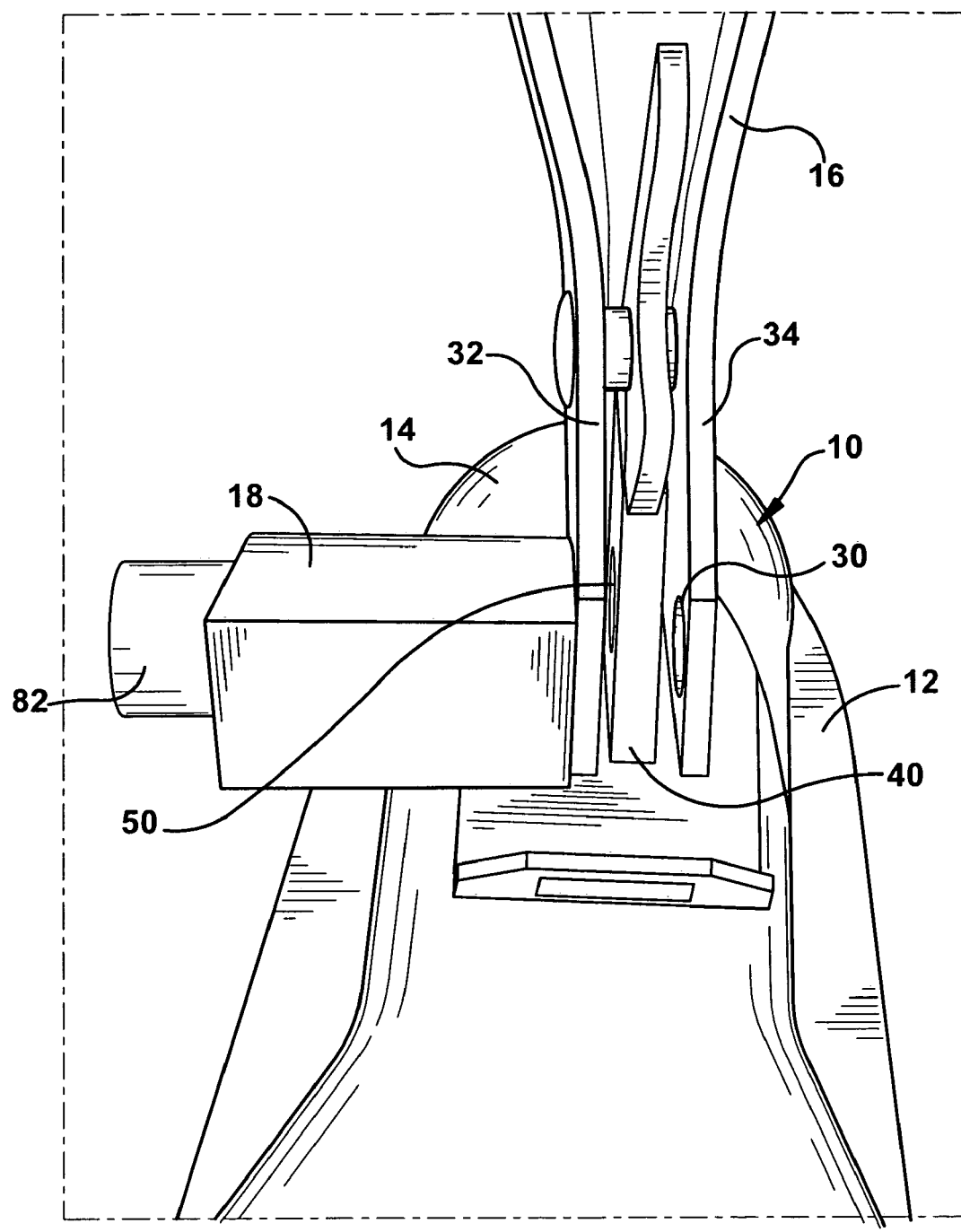
FIG. 5 illustrates a locking device attached to a coupler and at an unlocked position in an embodiment of the present invention.

As shown in FIGS. 2 and 5, a locking device 18 may be attached to, integrally formed with or removably secured to the handle 16 of the coupler 10 or to the coupler body 12. The locking device 18 may be permanently affixed to the handle 16 by, for example, welding the locking device 18 to the handle 16. In one embodiment, the locking device 18 may be cast or otherwise integrally formed with the handle 16. The locking device 18 may be secured to the handle 16 by use of an epoxy, adhesive or the like. The present invention should not be deemed as limited to any specific manner of attaching or securing the locking device 18 on the handle 16.

The locking device 18 is attached to or secured to the handle 16 such that the handle 16 is movable from the upward (first) position to the downward (second) position without interference from the locking device 18. The locking device 18 has a locking pin 20 extendable and retractable with respect to the locking device 18. The locking pin 20 preferably has a diameter corresponding in size and shape to the size of the aperture 30 of the handle 16 and the aperture 50 of the support. The locking pin 20 may have a length such that the lock pin 20 is extendable through the proximate side 32 of the handle 16 and at least a portion of the support 40. In a preferred embodiment, the locking pin 20 may extend such that the locking pin 20 extends through the proximate side 32 and is substantially flush with the distal side 34 of the handle 16.

At the extended position, the locking pin 20 prevents movement of the handle 16 from the downward (second) position to the upward (first) position. As a result, the locking device 18 locks the handle 16 such that the ball clamp remains in the locked position. In such a position, the ball clamp prevents the ball socket 14 from receiving and engaging a hitch ball. Therefore, the locking device 18 prevents an unauthorized user from moving the handle 16 to connect the ball socket of a hitch ball of the unauthorized user. At the retracted position, the locking pin 20 is within a housing 19 of the locking device 18 and does not interfere with the movement of the handle 16. As a result, a user is able to move the handle 16 to move the ball clamp from the locked position to the unlocked position.

In a preferred embodiment, the locking device 18 has a locking mechanism 80 to prevent unauthorized movement of the locking pin 20. The locking mechanism 80 may be, for example, a push-button lock so that the lock pin 20 can be extended within the handle 16 by pushing a lock button 82, as best shown in FIG. 5. In such an embodiment, the lock pin 20 may be released from within the aperture 50 of the support 40 and the aperture 30 of the handle 16 by use of a key to unlock the locking mechanism 80 and retract the locking pin 20. In an embodiment, the lock button 82 may move outward at retract position. For example, the lock button 82 may be spring-loaded, spring biased or otherwise forced outward from the housing 19 of the locking device 18.

The present invention should not be deemed as limited to any specific locking mechanism for securing the locking pin 20 in the extended position. The locking mechanism 80 may utilize a key, a unique shaft or pin, or other unique device for unlocking the locking mechanism 80. The locking mechanism 80 may incorporate a numerical code, digital code or otherwise require a user to input information into the locking device 18.

In use, a user of the towing vehicle and trailer disconnects the trailer from the towing vehicle. The user moves the handle 16 from the downward (second) position to the upward (first) position. As a result, the ball clamp releases the hitch ball so that the coupler 10 and the trailer may be separated from the towing vehicle. To secure the trailer from theft, the user moves the handle 16 from the upward (first) position to the downward (second) position. The user interacts with the locking device 18 to extend the locking pin 20 into the apertures 50 of the support 40 and the apertures 30 of the handle 16. For example, the user pushes the lock button 82 so that the locking mechanism 80 prevents unauthorized movement of the locking pin 20. Therefore, the handle 16 is locked in the downward (second) position in which a hitch ball is prevented from insertion into the ball socket 14. As a result, a thief or other unauthorized user is unable to use its own towing vehicle and hitch ball to steal the trailer.

To unlock the locking device 18, the user may insert a key into the locking mechanism 80 to retract the locking pin 20 from the apertures 30 of the handle 16 and the apertures 50 of the support 40. For example, the user may insert the key into the lock button 82 to retract the locking pin 20. The lock button 82 may "pop out" or otherwise move out of the housing 19 of the locking device 18 when the locking pin 20 retracts into the housing 19 of the locking device 18. The user may move the handle from the downward (second) position to the upward (first) position so that a hitch ball is freely insertable into the ball socket 14. The user may connect the hitch ball to the ball socket 14 of the coupler 10 and move the handle 16 to the downward (second) position so the ball clamp secures the hitch ball in the ball socket 14. The user may push the lock button 82 so that the locking device 18 secures the trailer to the towing vehicle by preventing the handle 16 from moving to the upward (first) position in which the ball clamp unlocks the hitch ball.

The invention has been described with reference to the preferred embodiment. Obviously, modifications and alternations will occur to others upon a reading and understanding of this specification. The claims as follows are intended to include all modifications and alterations insofar as they come within the scope of the claims or the equivalents thereof.

Have thus described an embodiment of the invention, the following is claimed:

1. A trailer coupler comprising:
    a coupler body;
    a ball socket sized and shaped to receive a hitch ball, the ball socket located within the coupler body;
    a handle connected to the ball socket, the handle movable to a first position where the hitch ball is insertable into the ball socket and to a second position where the hitch ball is prevented from insertion into the ball socket;
    a support member fixed to the coupler body, at least a portion of the support member being positioned within the handle when the handle is in the second position;
    a locking device permanently attached to the handle, the locking device preventing movement of the handle from the second position to the first position.

2. The trailer coupler of claim 1 wherein the first position is adjacent to the coupler body.

3. The trailer coupler of claim 1 wherein the locking device includes a locking pin extendable to prevent movement of the handle from the second position to the first position.

4. The trailer coupler of claim 3 wherein the locking pin extends and retracts from an aperture in the handle.

5. The trailer coupler of claim 4 wherein the locking device includes a locking mechanism to prevent unauthorized movement of the locking pin.

6. The trailer coupler of claim 5 wherein the locking mechanism includes a push button that is depressed to extend the locking pin into the aperture of the handle.

7. The trailer coupler of claim 6 wherein the push button includes the locking pin that is retraced by use of a key with the push button.

8. The trailer coupler of claim 4 wherein the locking pin retracts into a housing of the locking device to allow movement of the handle.

9. The trailer coupler of claim 1 wherein the locking device is welded to the handle.

10. The trailer coupler of claim 1 wherein the locking device is integrally formed with the handle.

11. The trailer coupler of claim 1 wherein the locking device is permanently attached to the body of the trailer coupler.

12. The trailer coupler of claim 1 wherein the support member includes an aperture aligned with an aperture in the handle when the handle is at the second position.

13. The trailer coupler of claim 12 wherein the locking device has a locking pin that is extendable through the aperture of the handle and the aperture of the support member to prevent movement of the handle from the second position to the first position.

14. A trailer coupler securable to a hitch ball of a towing vehicle comprising:
- a ball socket located within a coupler body;
- a handle operably connected to the ball socket, the handle movable from a first position where the hitch ball is insertable and removable from the ball socket to a second position where the hitch ball is prevented from insertion or removal from the ball socket, the handle having an aperture;
- a support member permanently attached to the coupler body, wherein said support member is located above the coupler body and adjacent the handle, the support member having an aperture aligned with the aperture of the handle when the handle is at the second position; and
- a locking device attached to the handle, the locking device having a locking pin extendable into the aperture of the handle and the aperture of the support member to prevent the handle from moving from the second position to the first position.

15. The trailer coupler of claim 14 wherein the locking device includes a locking mechanism to prevent unauthorized movement of the locking pin.

16. The trailer coupler of claim 15 wherein the locking mechanism includes a housing, the locking pin retractable into the housing and extendable from the housing.

17. A method of securing a trailer coupler from unauthorized connection to a hitch ball comprising:
- providing a coupler body;
- providing a ball socket on the coupler body;
- connecting a handle to the ball socket that is movable from a first position to a second position, the second position preventing insertion of the hitch ball at the second position, the handle having an aperture;
- aligning the handle aperture with an aperture in a support member attached to the coupler body; and
- permanently attaching a locking device to the handle, the locking device having a locking pin extendable and retractable into the aperture of the handle and the support member aperture.

18. The method of claim 17 further comprising the step of:
- incorporating a locking mechanism into the locking device to prevent unauthorized movement of the locking pin.

19. The method of claim 18 wherein the handle is freely movable if the locking pin is retracted from the aperture of the handle.

20. The method of claim 18 wherein the locking mechanism includes a push button to extend the locking pin into the aperture of the handle, wherein insertion of a key into the push button retracts the locking pin from the handle.

* * * * *